R. E. TALLEY.
BEVEL GEAR.
APPLICATION FILED JULY 5, 1919.

1,341,685.

Patented June 1, 1920.

WITNESSES:
J. A. Helsel
W. H. Woodman.

INVENTOR
Randel E. Talley.
BY
Wesley G. Carr
ATTORNEY

UNITED STATES PATENT OFFICE.

RANDAL E. TALLEY, OF IRWIN, PENNSYLVANIA, ASSIGNOR TO WESTINGHOUSE ELECTRIC & MANUFACTURING COMPANY, A CORPORATION OF PENNSYLVANIA.

BEVEL-GEAR.

1,341,685.            Specification of Letters Patent.        Patented June 1, 1920.

Application filed July 5, 1919. Serial No. 308,741.

*To all whom it may concern:*

Be it known that I, RANDAL E. TALLEY, a citizen of the United States, and a resident of Irwin, in the county of Westmoreland and State of Pennsylvania, have invented a new and useful Improvement in Bevel-Gears, of which the following is a specification.

My invention relates to gear wheels and, more particularly, to bevel gears and pinions and it has, for its primary object, the provision of a molded, composite, bevel gear of improved construction and superior strength.
Heretofore, gear wheels have been formed of superimposed layers of fibrous sheet material, such as paper or duck, impregnated with a heat hardened binder such as a phenolic condensation product. In manufacturing such gears, the layers of sheet material are disposed in planes at right angles to the axis of the gear to be formed and the assembled material is generally cured and hardened in the form of plates or blanks from which gears are subsequently cut.

Spur gears and the like cut from plates of this character are unusually strong, durable and silent in operation and have been found to be very satisfactory, as cutting spur teeth in the periphery of a gear blank of such material provides teeth in which the working faces are comprised of edges of the sheet material so that the strain exerted upon the teeth is exerted against the edges of the several layers constituting the gear body.

It has been found, however, that bevel gears constructed from plates or blanks of superimposed layers of fibrous sheet material and a hardened binder are not so satisfactory as the end thrust transmitted to them by a meshing gear or pinion acts, not against the edges of the laminations, but rather against the faces thereof and, consequently, tends to separate the several layers or laminations. Because of this, it has been necessary either to employ shrouds or to limit the face angle of gears of this character to about 30°.
The primary object of my present invention resides in providing a bevel gear, of laminated non-metallic material having a self-supporting working body, of such character as to permit cutting of the teeth at any desired angle without necessitating the employment of shrouds or other supporting means.

Figure 1:
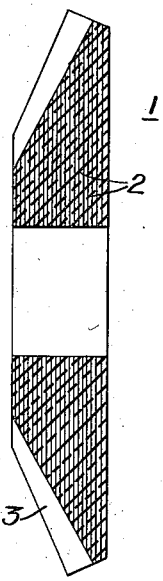
Figure 2:
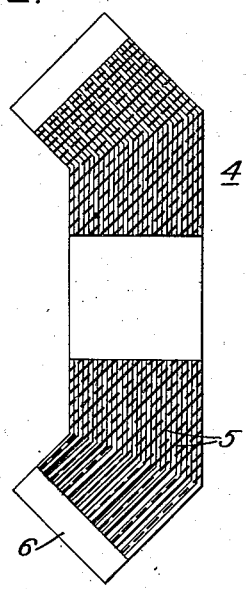
Figure 3:
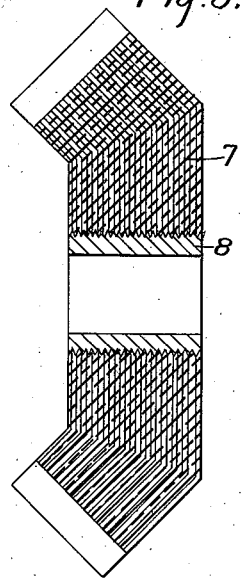

In the drawings, Figure 1 is a diametral sectional view of a bevel gear of a laminated non-metallic material as they are usually constructed; Fig. 2 is a corresponding view of a similar gear constructed in accordance with my invention and Fig. 3 is a similar view of my gear with a metal hub.

It has been common practice, in the past, to impregnate suitable fibrous sheet material, such as duck or paper, with a suitable binder such as shellac, copal or other varnish gum or gum resins, but preferably with a binder such as a phenolic condensation product, and to superimpose the sheet material so treated and to subject it to heat and pressure to compact it and harden its binder to form a laminated non-metallic plate which is hard and unaffected by moisture, oils and the like. Gear blanks have been cut from such plates and gears have been machined from the blanks. It has been found, however, that bevel gears cut from such blanks must either be reinforced with shrouds or their face angles must be limited to about 30° to prevent separation of the layers in use.

This will be clearly apparent from a consideration of Fig. 1 of the drawings, in which I have disclosed a bevel gear 1 of laminated, non-metallic material as constructed prior to my present invention. This gear may comprise a plurality of superimposed layers or laminations 2, of fibrous sheet material such as duck or paper, impregnated with and bound together by, a hardened binder such as a phenolic condensation product. As here shown, the teeth 3 cut in the periphery of the gear are formed at an inclination to the several laminations or layers comprising the gear body so that end thrust exerted against the layers, by a meshing gear or pinion, is applied in a direction tending to force apart or separate the various layers. Because of this, a gear of this character must have its face angle limited to about 30° or it must be reinforced by shrouds.

According to my present invention, I may superimpose properly impregnated sheet material in the same manner as has been previously done and before subjecting it to heat and pressure, I may cut from it annular or circular gear blanks of the desired dimensions. The gear blanks thus provided may then be cured in molds of suitable construction to cause a dishing of the blanks and consequently of the layers comprising it. By providing molds with working faces of various degrees of curvature it is possible to cause such dishing of the molded blanks as will bring the peripheral edge portions of the layers or laminations comprising the blanks at substantially right angles to the plane at which the teeth are to be cut.

It will, of course, be understood that during this molding or dishing of the blanks, they are not only subjected to pressure but also to heat so that the binder is transformed to its hard, strong, and substantially insoluble condition. After the blanks have thus been cured the teeth may be cut in the usual or any preferred manner.

Obviously, in place of cutting gear blanks from a stack of suitably treated sheet material, the blanks may be punched or otherwise cut from a single-impregnated sheet and a suitable number of the layers thus provided may be superimposed to provide a gear body of the desired thickness, when cured.

In Fig. 2 I have illustrated a bevel gear 4 constructed in accordance with my invention, in which the dishing or curving of the several layers or laminations 5 is clearly indicated. As here shown, the portions of the laminations forming the teeth 6 are disposed at substantially right angles to the faces of the teeth so that the end thrust exerted against the gear is directed against the edges of the several layers or laminations, as is the case in the ordinary spur gear of this character, and does not act or tend, in any way, to separate the layers. Because of this, bevel gears constructed in accordance with my invention are much stronger than those previously formed of similar material, the face angles of their teeth are in no way limited and the employment of shrouds is rendered unnecessary.

If desired, a gear ring 7 may be molded upon a metal hub 8 as shown in Fig. 3, the ring being dished or bent during the curing of the binder.

Although I have described my invention in considerable detail, both as regards the materials employed and the manner of assembling and treating them, it will be understood that my invention is to be in no way limited, other than as set forth in the claims.

I claim as my invention:—

1. A bevel gear or pinion comprising a body of superimposed layers of fibrous sheet material and a hardened binder, the peripheral edge portions of the sheets being bent to dispose them at substantially right angles to the face of the gear teeth.

2. A bevel gear or pinion comprising a body of superimposed layers of fibrous sheet material and a binder, the sheets being bent to provide an outwardly flaring peripheral flange and teeth cut in the edge of the flange.

3. A bevel gear or pinion comprising superimposed layers of fibrous sheet material and a heat hardened binder, the edge portions of the layers being bent to provide an outwardly flaring peripheral flange and teeth cut in the flange.

4. A bevel gear or pinion comprising superimposed layers of fibrous sheet material associated with a phenolic condensation product, the peripheral edges of the layers being bent to provide an outwardly flaring flange and teeth cut in the flange.

5. A bevel gear or pinion comprising a metallic hub and a working body of superimposed layers of fibrous sheet material and a binder molded thereon, the sheets being bent to provide an outwardly flaring peripheral flange in which the teeth are cut.

6. A gear blank for forming bevel gears or pinions comprising a body formed with an outwardly flaring peripheral flange, the body being composed of superimposed layers of fibrous sheet material and a hardened binder with the edge portions of the sheets and projecting into and forming the flange.

7. A bevel gear or pinion comprising a body of superimposed layers of fibrous sheet material and a hardened binder, the edge portions of the layers being bent to provide a peripheral flange and teeth cut in the flange.

8. The method of forming a bevel gear or pinion blank which comprises superimposing layers of fibrous sheet material impregnated with a phenolic condensation product to provide a planiform body, bending portions of the sheets to create an outwardly flaring peripheral flange upon the body and subjecting the body to heat and pressure while the sheets are thus bent to compact it and harden the binder.

9. A method of forming a bevel gear or pinion which comprises superimposing layers of fibrous sheet material associated with a binder to provide a planiform body, bending portions of the sheets to create a peripheral flange about the body, treating the body to compact it and harden the binder and cutting teeth in the flange.

In testimony whereof, I have hereunto subscribed my name this 24th day of June 1919.

RANDAL E. TALLEY,